3,674,382
HERMETICALLY SEALED ELECTRIC
COMPRESSOR
Tadao Kubota and Keisuke Ida, Fuji-shi, Japan, assignors to Tokyo Shibaura Electric Co., Ltd., Kawasaki-shi, Japan
Filed Feb. 4, 1971, Ser. No. 112,631
Claims priority, application Japan, June 25, 1970, 45/62,620
Int. Cl. F04b *17/00, 35/00, 39/02;* F01m *1/00*
U.S. Cl. 417—372                                          4 Claims

ABSTRACT OF THE DISCLOSURE

A hermetically sealed electric compressor comprising a longitudinal lubricant passage for conducting a lubricant to the rotating and sliding parts and a revolving shaft provided with a receptacle passage crosswise passing through said lubricant passage and revolving shaft, wherein the revolving shaft is fitted with a ring sleeve and the receptacle is disposed between the sleeve and the opening of the receptacle passage penetrating the outer surface of the shaft thereby to receive solid foreign matter in the receptacle.

---

The present invention relates to a hermetically sealed electric compressor provided with a receptacle for foreign matter.

In a conventional compressor of such kind, there is formed a blind hole crosswise of a longitudinal lubricant passage for conducting a lubricant received in a revolving shaft to the rotating and sliding parts and foreign matter contained in the lubricant travelling through the lubricant passage is carried into the blind hole by a centrifugal force generated by the rotation of the revolving shaft, thereby removing the foreign matter from the lubricant conducted from a reservoir to the rotating and sliding parts through the lubricant passage to prevent the intrusion of the foreign matter into said parts. However, the prior art compressor has the drawback that the blind hole for holding foreign matter unavoidably has a small capacity due to limitations imposed by the radius of the revolving shaft. Moreover, perforation of the blind hole is a difficult operation, requiring a considerable amount of machining work.

A compressor according to the present invention has a foreign matter receptacle disposed between a receptacle passage crosswise passing through a lubricant passage provided in a revolving shaft and a split ring sleeve fitted to the revolving shaft.

An object of the present invention to to provide a compressor having a receptacle of large capacity for holding foreign matter, thereby preventing the foreign matter from intruding into the rotating and sliding parts, though the compressor may be operated long.

Another object of the invention is to provide a compressor having a receptacle which facilitates manufacture, assembly, adjustment and cleaning due to application of a split ring sleeve.

Still another object of the invention is to provide a compressor wherein the receptacle passage is made to open to a void space in a casing to conduct gaseous refrigerant thereto.

A further object of the invention is to provide a compressor wherein the receptacle is easily changeable in volume.

The present invention can be more fully understood from the following detailed description when taken in connection with the accompanying drawings, in which.

Figure 1:
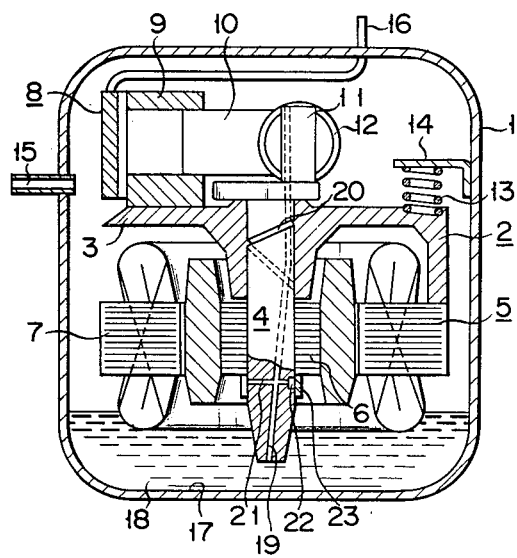
FIG. 1 is a longitudinal sectional view of a hermetically sealed electric compressor according to an embodiment of the present invention.

Referring to FIG. 1, numeral 1 denotes a casing for hermetically sealing a compressor body 2. The compressor body 2 comprises a frame 3; an electric motor 5 including a revolving shaft 4 passing through the center of the frame 3, a rotor 6 substantially integrally fitted to the revolving shaft 4 and a stator 7 suspended from the underside of the frame 3; and a compressing unit 8 consisting of a cylinder 9 fixed on the frame 3 and a piston 10 reciprocating through said cylinder 9 by means of a shaft 11 for said reciprocation fixed to the upper end of the revolving shaft 4 in eccentric relationship with respect to the rotation of said revolving shaft 4. The piston 10 and the shaft 11 are connected to each other through a scotch yoke 12. The compressor body 2 is elastically suspended in the casing 1 by springs 13 hanging from spring hangers 14 fixed to the upper part of the inner wall of the casing 1. Further, the compressor may be so constructed as to have the compressor body 2 inserted into the casing 1 under pressure for loose fit. Numerals 15 and 16 represent inlet and outlet tubings for a refrigerant. The inner bottom portion of the casing constitutes a reservoir 17 for a lubricant 18. The revolving shaft 4 has its bottom end immersed in the lubricant 18 and a lubricant passage 19 bored therethrough in the longitudinal direction. Said lubricant passage 19 is inclined outward to the axis of the revolving shaft 4, the bottom end of said passage 19 opening to the center of the bottom end face of the revolving shaft 4 and the upper end of said passage 19 opening to the lower end of a helical groove or grooves 20 provided in that part of the revolving shaft 4 which engages the frame 3, as well as to the supper end of the shaft 11 for reciprocating the piston 10. There is also provided a receptacle passage 21 which extends substantially crosswise through the lubricant passage 19 and the revolving shaft 4 in a plane below the rotor 6. It is preferred that said receptacle passage 21 be located above the level of the lubricant 18.

Figure 2:
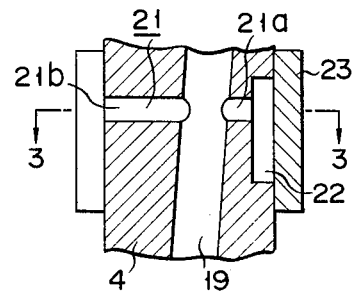
FIG. 2 is an enlarged longitudinal sectional view of a foreign matter receptacle.
Figure 3:
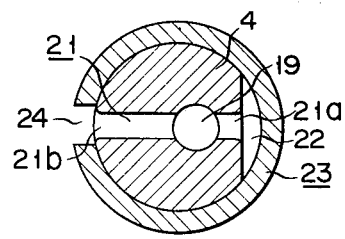
FIG. 3 is a sectional view on line 3—3 of FIG. 2.

Referring to FIGS. 2 and 3, numeral 21a denotes a passage for solid foreign matter provided at a point where the lubricant passage 19 draws nearer to the outer wall of the revolving shaft 4. Numeral 21b represents a passage for refrigerant disposed at a point where the lubricant passage 19 is more removed from the opposite outer wall of said revolving shaft 4.

Numeral 22 shows a receptacle which is formed by cutting out part of the outer wall of the revolving shaft 4 so as to cause said solid foreign matter passage 21a to open to the interior of said receptacle 22.

Figure 4:
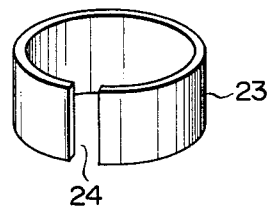
FIG. 4 is a perspective view of a ring sleeve used in the embodiment of FIGS. 1 to 3.

Numeral 23 denotes a ring sleeve so fitted to the outer wall of the revolving shaft 4 as to cause the inner wall of the sleeve 23 fully to close up the opening of the receptacle 22 in air-tight relationship and the upper end face of the sleeve 23 to contact or be disposed close to the underside of the rotor 6. On the side of the ring sleeve 23 is perforated a slit 24 (FIG. 4). When the sleeve 23 is mounted on the revolving shaft 4, the refrigerant passage 21b communicates with a void space in the casing 1 through said slit 24. If the ring sleeve 23 is made of elastic metal, it will offer convenience in its assembly, disassembly and replacement.

There will now be described the operation of an electric compressor according to the present invention. When the electric motor 5 drives the revolving shaft 4, the piston 10 reciprocates through the cylinder 9 by means of the shaft 11 and scotch yoke 12. As a result, a gaseous refrigerant entering the casing 1 from the inlet tubing 15 through a check valve (not shown) is sucked into the cylinder 9 so as to be compressed and discharged into the outlet tubing 16 through another check valve (not shown).

As mentioned above, the lubricant passage 19 is outwardly inclined to the axis of the revolving shaft 4 to be more removed therefrom from the bottom to the top of said shaft 4. Accordingly, when the revolving shaft 4 rotates, the higher is the position assumed by the lubricant in the lubricant passage 19, and the greater is the centrifugal force applied to the lubricant. As a result, the lubricant goes up the lubricant passage 19 to the helical groove 20 to wet a bearing disposed between the revolving shaft 4 and frame 3 and is later discharged through an opening formed at the upper end of said passage 19. On the other hand, any foreign matter entrained with the lubricant moves up through the lubricant passage 19 from its bottom. Said foreign matter such as fine iron particles heavier than the lubricant is subject to a stronger centrifugal force and forced toward the outer circle of the rotation of the revolving shaft 4, so that said foreign matter is collected in the receptacle 22 through the solid foreign matter passage 21a.

Conversely, lighter foreign matter than the liquid lubricant such as a gaseous refrigerant is gathered on the inside of said shaft rotation and expelled into a void space in the casing 1 through the gaseous refrigerant passage 21b and the slit 24 in the ring sleeve 23.

As described above, there is eliminated from the liquid lubricant solid foreign matter through the passage 21a and receptacle, and a gaseous refrigerant through the passage 21b, always enabling a clean liquid lubricant to be supplied to the rotating and sliding parts. Once any foreign matter is received in the receptacle 22, it is kept therein by a centrifugal force when the revolving shaft 4 rotates or sedimentation to the bottom of the receptacles when the shaft 4 is not operated, without flowing backward into the lubricant passage 19.

Where it is desired further to increase the capacity of the receptacle 22 used in the foregoing embodiment, the revolving shaft 4 has only to be subjected to a simple additional machining step of raising the height or extending the length of the receptacle 22.

Figure 5:
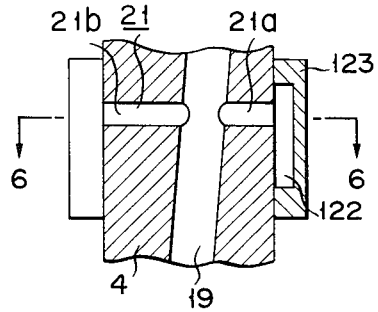
FIG. 5 is an enlarged longitudinal sectional view of a foreign matter receptacle according to another embodiment of the invention.
Figure 7:
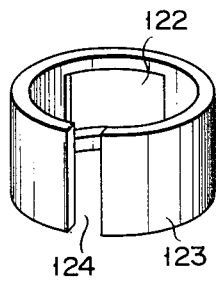
FIG. 7 is a perspective view of a ring sleeve used in the embodiment of FIGS. 5 and 6.
Figure 6:
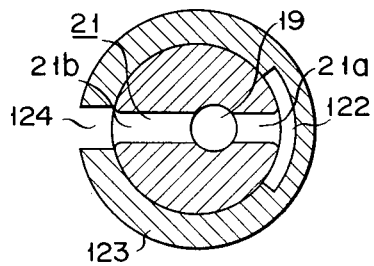
FIG. 6 is a sectional view on line 6—6 of FIG. 5.

FIGS. 5 to 7 represent another embodiment of the present invention. According to this embodiment, there is not provided the receptacle 22 in the revolving shaft 4 as in the preceding embodiment, but there is formed a depressed part in the inner wall of the ring sleeve 123 to constitute a receptacle 122 (FIG. 7). Also in the embodiment of FIGS. 5 to 7, the passages 21a and 21b for solid and gaseous refrigerant communicate with a void space in the casing 1 through the receptacle 122 and the slit 124 of the ring sleeve 123. While this embodiment has essentially the same function as the preceding one, it has the advantage that the mechanical strength of the revolving shaft 4 is reinforced by omission of a receptacle therefrom.

What we claim is:

1. A hermetically sealed electric compressor having a casing and a compressor body including a frame, an electric motor, a revolving shaft of the electric motor operating a compressing unit and being received in the casing, the revolving shaft comprising a lubricant passage bored therein in the longitudinal direction and open to a lubricant reservoir provided at the inner bottom of the casing, a receptacle passage crosswise passing through the lubricant passage, a ring sleeve fitted to the outer wall of the revolving shaft, and a receptacle hermetically provided between the outer wall of the revolving shaft and ring sleeve, one end of the receptacle passage opening to the interior of the receptacle.

2. The compressor according to claim 1 wherein the receptacle is formed by cutting out part of the outer wall of the revolving shaft.

3. The compressor according to claim 1 wherein the receptacle is constituted by a depression provided in the inner wall of the ring sleeve.

4. The compressor according to claim 1 wherein the ring sleeve has a slit to which there opens the other end of the receptacle passage.

References Cited
UNITED STATES PATENTS

| | | | |
|---|---|---|---|
| 2,500,751 | 3/1950 | Halfvarson | 417—902 X |
| 2,996,240 | 8/1961 | Stocklein et al. | 417—902 X |

ROBERT M. WALKER, Primary Examiner

U.S. Cl. X.R.

184—6.18